United States Patent [19]

Braga et al.

[11] 4,291,238

[45] Sep. 22, 1981

[54] POWER SWITCH MODULE

[75] Inventors: Albert T. Braga, Lincoln Township, Berrien County; Roger J. Cartier, Benton Township, Berrien County; Edward H. Getz, Pipestone Township, Berrien County; Warren R. Hafstrom, Lincoln Township, Berrien County, all of Mich.

[73] Assignee: Whirlpool Corporation, Benton Harbor, Mich.

[21] Appl. No.: 118,599

[22] Filed: Feb. 4, 1980

[51] Int. Cl.³ .................... H01H 43/04; H01H 43/10
[52] U.S. Cl. ................ 307/141.4; 200/37 A; 200/38 BA
[58] Field of Search ............ 307/141, 141.4; 200/38 R, 38 B, 38 BA, 38 C, 38 CA, 36, 37 R, 37 A; 361/195

[56] References Cited

U.S. PATENT DOCUMENTS

| | | | |
|---|---|---|---|
| 1,146,889 | 7/1915 | Lundquist | 179/18 FD |
| 3,436,696 | 4/1969 | Carlisle et al. | 335/106 |
| 3,657,627 | 4/1972 | Inaba et al. | 318/601 |

Primary Examiner—L. T. Hix
Assistant Examiner—James L. Dwyer
Attorney, Agent, or Firm—Hill, Van Santen, Steadman, Chiara & Simpson

[57] ABSTRACT

A power switch module for use in controlled-sequence devices such as a domestic laundry appliance has switches arranged in a pattern about a central portion of the module selectively closeable to connect circuitry associated with each switch to a source of electric potential. Each switch has an associated actuator movable to open and close the switch, and each actuator is operated by a hammer having a striking surface for depressing an actuator to open a switch and a camming surface for raising an actuator to close a switch. The hammer is mounted for rotation on a shaft and is axially movable by a solenoid. A disc encoder on the shaft derives hammer-position information which is transmitted to a microprocessor which controls sequential operation of the device and energizes the solenoid to open or close a switch at appropriate times during operation.

19 Claims, 9 Drawing Figures

POWER SWITCH MODULE

BACKGROUND OF THE INVENTION

1. Field of the Invention

The present invention relates to a multiple power switch module, and in particular such a module useable with a microprocessor to control operation of a domestic laundry appliance.

2. Description of the Prior Art

The prior art is exemplified by U.S. Pat. Nos. 1,146,889 and 3,657,627.

Programmed microprocessor units have wide application in the automatic control of sequentially operated machinery. Such microprocessor units provide output signals in a sequence corresponding to the program to selectively connect electrically operated machinery components to a source of electric potential. Such switching may be accomplished by electronic switches, such as triacs, or mechanically by movement of an actuator to make and break electrical contacts.

In an automatic laundry appliance switches are required to energize and de-energize the appliance motor and solenoids respectively controlling agitate, drain and spin functions, for shifting the appliance through the various cycles of spinning and agitation and to operate solenoids controlling hot and cold water valves, and the solenoids controlling the bleach, detergent and fabric softener dispensers. In the particular application of microprocessor-controlled switching in domestic laundry appliances, such switching has heretofore been of the electronic switch type, with a triac connected between each microprocessor output and the associated electrical component which that output controls, so that upon the appearance of a command signal on the appropriate output line, the triac connects or disconnects the associated electrical component to a source of electrical potential. The reliability of such triac switching is acceptable, however, because triacs are inherently subject to failure due to voltage fluctuations, frequency of use, and other factors, mechanical switching is often preferable.

A problem in the art has been to provide a mechanical switching apparatus for accomplishing a number of relatively high speed switching operations in proper sequence which has comparable speed and accuracy to triac switches.

SUMMARY OF THE INVENTION

The present invention is a power switch module for use with a microprocessor unit to sequentially connect a number of electrically operated components of a machine such as a domestic laundry appliance to a source of electrical potential in accordance with a programmed cycle of operation. The module has a housing containing switches associated with each component, having spring contacts movable into conducting and nonconducting positions by a wedge actuator disposed between the spring contacts. Each actuator has a head and is supported by and extends out of the housing in a pattern which may be circular or square.

A hammer is carried on a rotatably driven shaft extending through the housing and is axially movable by energizing a solenoid to position the hammer in a plane above an actuator or in a plane of contact therewith. The hammer is provided with a striking surface and a camming surface and if the solenoid is energized while the hammer is positioned above a particular actuator, the hammer will push the actuator into the housing, thereby wedging the electric contacts of the associated switch apart to an open or nonconducting position. If the solenoid is energized while the hammer is between adjacent actuators, the hammer camming surface will engage a cam follower on the actuator to lift the actuator out of the housing, allowing the electrical contacts of the associated switch to engage and complete a path to a source of electrical potential.

A triac or other high power switching device is disposed between the power switch module and a source of AC potential and is triggered by an appropriate signal from the microprocessor.

Feedback information is provided from the power switch module to the microprocessor to inform the microprocessor of the position of the hammer in order to allow the microprocessor to trigger the triac at the appropriate time to accomplish the desired switching by the power switch module as hereinafter more fully described.

In the power switch module such feedback information is provided by a rotary disc encoder co-rotatably mounted on the shaft. The edge of the encoder is divided into sections by radial slots which allow momentary transmission of a light beam between a light source and receiver. Each switch or station has associated therewith on the disc a large slot which alerts the microprocessor to the approach of a serial four bit coded set of slots identifying the particular switch. If the switch is to be opened, the solenoid is energized to cause the hammer to strike the switch actuator when the hammer is over the actuator. If a switch is to be closed the solenoid is energized after passing over the preceding actuator so that the proper actuator is cammed by the hammer out of wedged engagement between the switch contact springs.

In one embodiment, the housing is generally circular in shape and the actuators are disposed therein in a circular pattern with the drive shaft extending through a central portion of the housing equidistant from each actuator.

Another embodiment of the invention utilizes a square housing with the actuators disposed on sides of a square with the solenoid for axially moving the hammer disposed at one corner of the housing and the hammer having spaced camming and striking surfaces thereon such that depending upon the position of a particular actuator, one of the camming or striking surfaces will engage the actuator when commanded to do so by the microprocessor.

DESCRIPTION OF THE PREFERRED EMBODIMENTS

Figure 1:
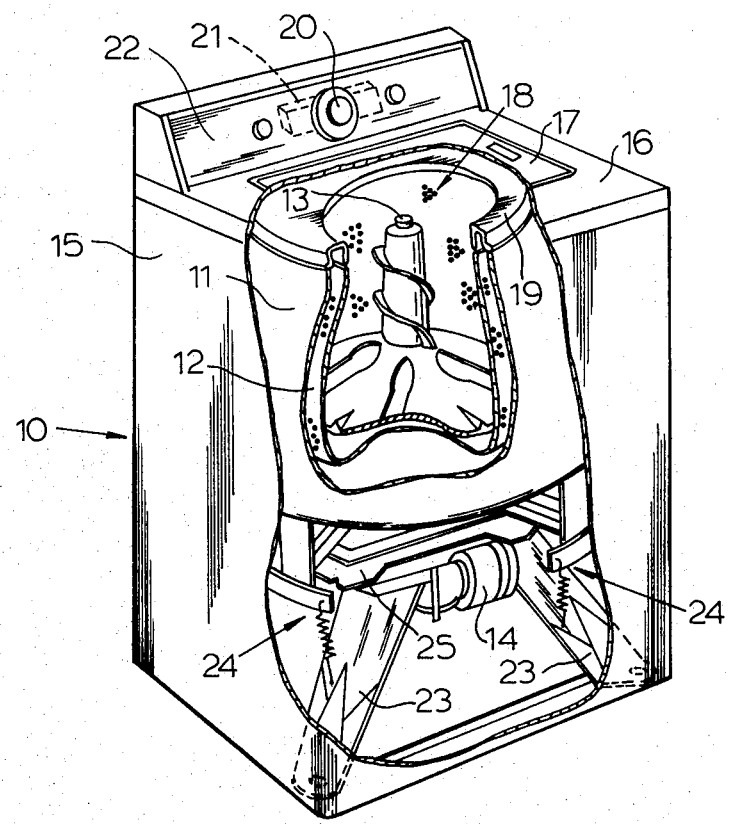
FIG. 1 is a perspective view, partly broken away, of a vertical axis laundry appliance of the type in which the power switch module may be used.

An automatic laundry appliance is generally illustrated at FIG. 1 at 10 as comprising a tub 11 which has a perforate clothes container or spin basket 12 contained therein and an agitator 13 vertically disposed within the spin basket 12, mounted for oscillatory movement with respect thereto. The basket 12 is mounted for spinning movement for centrifugal extraction of water from the clothes within the basket 12. The tub 11, the spin basket 12, the agitator 13 and a drive mechanism 14 therefor are contained in a cabinet 15.

The cabinet 15 has a top 16 having a hinged lid 17 which is opened to afford access to a clothes-receiving opening 18 which is defined by a tub ring 19 extending about the tub and over a corresponding opening in the spin basket 12. The cabinet 15 also includes a program controller including a timer dial 20 connected to a timing device 21 which is mounted on a control panel portion 22 of the cabinet 15. The timer device 21 may be a microprocessor or any suitable control means capable of generating sequential electrical impulses in response to a user-entered program. Suitable wiring (not shown) connects the timer 21 to the drive mechanism 14 and to other electrical components of the appliance through a power switch module, more fully detailed below, to control operation of a wash cycle in a sequence as is known in the art.

The program controller provides the washing appliance with a sequence of events including agitating the clothes load in a washing portion of the cycle, spinning the clothes load in the basket 12 to centrifuge the washing liquid therefrom, agitating the clothes load in a rinsing portion of the cycle, and spinning the clothes load in the basket 12 to centrifuge the rinsing liquid therefrom. The timer dial 20 and the timing device 21 may be mounted in any desired location, as may be the other components, which are shown in the present location for illustrative purposes only. All components inside the cabinet 15 are supported on a frame 25 by a tripod, two struts 23 of which are visible in FIG. 1. A suspension system 24 is interconnected between the struts 23 and the frame 25 to minimize vibration.

Figure 2:
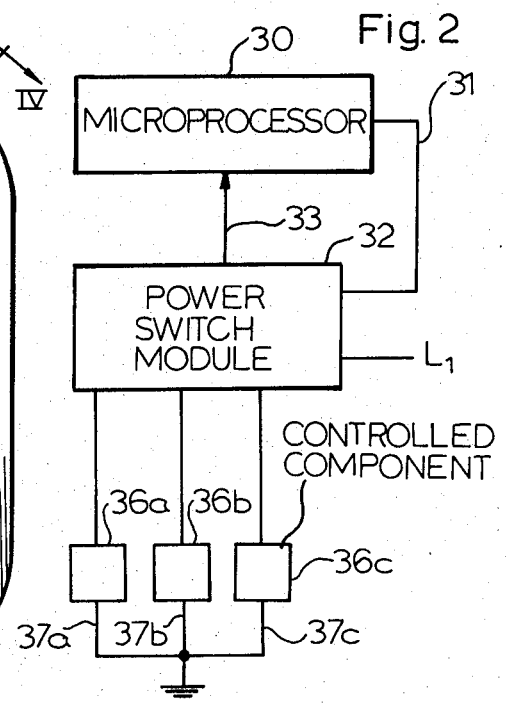
FIG. 2 is a schematic diagram showing the placement of the power switch module in a control circuit.

A schematic circuit diagram illustrating the interconnection of the power switch module disclosed and claimed herein is shown in FIG. 2 interconnected with a microprocessor and with other components of the appliance 10. A microprocessor 30 has an output line 31 for transmitting electrical signals to the power switch module 32. A feedback line 33 informs the microprocessor of the position of a rotating hammer on the power switch module 32. The power switch module 32 is connected to a triac (not shown) which is triggered by the microprocessor 30 to energize a solenoid within the power switch module for purposes hereinafter more fully described.

The power switch module 32 has 110 V input L1 and outputs connected to a plurality of controlled components 36a, 36b and 36c all of which are connected to ground through lines 37a, 37b and 37c. In the embodiments of the invention disclosed herein, the power switch module 32 houses 12 switches, thereby allowing control of 12 separate components, however, any number of components may be controlled with the apparatus and in the manner disclosed herein without departing from the inventive concept.

Figure 3:
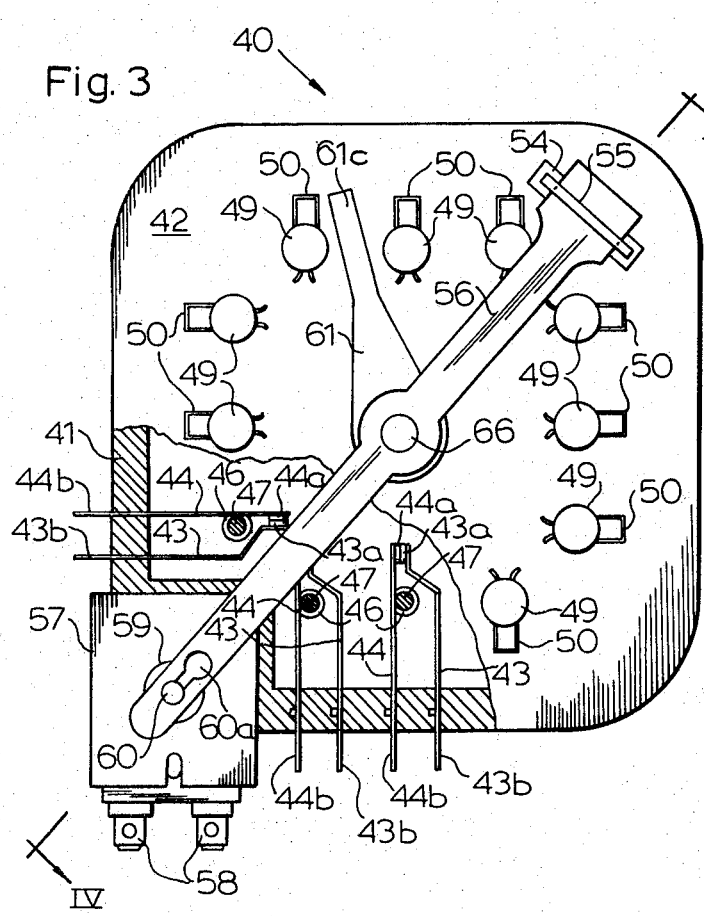
FIG. 3 is a plan elevational view partially cut away, of a power switch module having switch actuators arranged in a square pattern.

A square embodiment of the power switch module is shown at 40 in FIG. 3. The module 40 consists of a housing 41 having a top 42 and has a plurality of switches disposed in an interior thereof. Each switch consists of a stationary contact-carrying member 43, having a contact 43a and a terminal 43b, and a movable contact-carrying member 44 having a contact 44a and a terminal 44b only some of which are shown. Each contact-carrying member 43 and 44 is fixed in the housing 41 with the terminals 43b and 44b extending outwardly therefrom. The switches shown in FIG. 3 are shown in an electrically conducting state with the contacts 43a and 44a closed.

Figure 4:
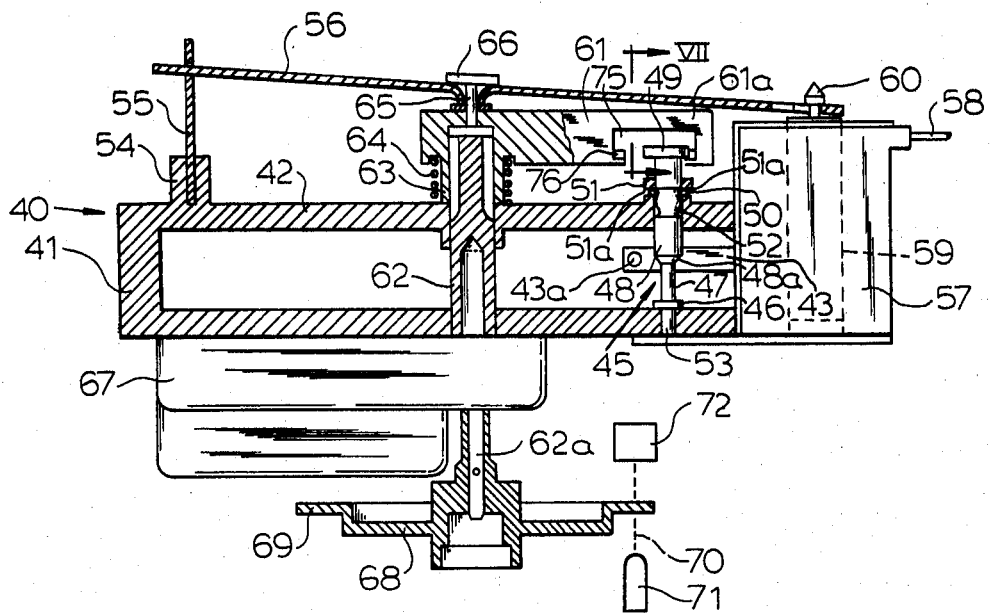
FIG. 4 is a sectional view taken substantially along line IV—IV of FIG. 3 with the parts positioned as they would be immediately prior to the lifting of an actuator.
Figure 5:
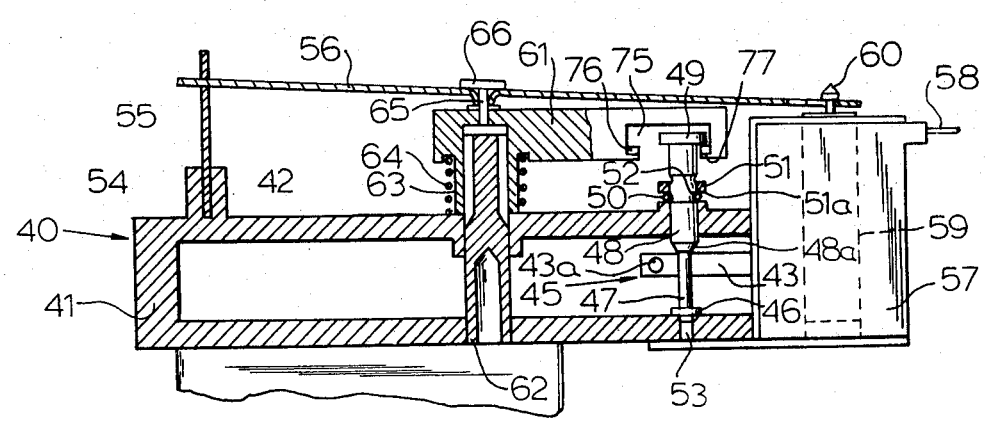
FIG. 5 is a sectional view taken substantially along line IV—IV of FIG. 3 showing the process of lifting an actuator.

As shown in greater detail in FIGS. 4 and 5, the module 40 is provided with a plurality of cylindrical switch actuators 45. Each actuator 45 has a lower portion 47 and an upper portion 48, with the upper portion 48 having a greater diameter than the lower portion 47. A ramped surface or wedge 48a is disposed between the portions 47 and 48. The actuator 45 is provided with a stop 46 near the bottom thereof to prevent movement of the actuator 45 beyond a specified distance in a downward direction. A head 49, having a greater diameter than the upper portion 48, is disposed at a top of each actuator 45.

Each actuator 45 is maintained in generally vertical position by a boss 51 integrally formed on the module top 42. A receptacle 53 in the housing 41 receives the termination of the lower portion 47 to further assist in maintaining vertical alignment. The boss 51 is slotted on either side at 51a for receiving a spring clip 50. The actuator 45 is provided with two spaced annular detents 52 to maintain the actuator 45 in raised and lowered positions once moved to those positions.

As further detailed in FIGS. 3, 4 and 5, the module 40 has a boss 54 receiving a supporting member 55 which is connected to a bar 56 disposed generally on a diagonal of the module 40.

A solenoid 57 is disposed at one corner of the module 40 and has terminals 58 and a movable plunger 59 which terminates in an enlarged retainer 60. A keyed aperture 60a in the bar 56 allows engagement of the bar 56 with the plunger 59 for co-movement therewith.

The module 40 is further provided with a hammer 61 having an elongated portion 61a which extends above the actuator heads 49. The elongated portion 61a has a receptacle 75 in a lower portion thereof having an opening defined by inwardly extending lugs 77. Each lug 77 has an upwardly sloping ramp surface 76.

The hammer 61 has a collar 63 for receiving a shaft 62 for corotational movement therewith. The hammer 61 is normally biased away from the module top 42 by a spring 64. The shaft 62 is rotated by a drive means such as a timer motor 67. The timer motor also drives an encoder disc 68 at the same speed as shaft 62 through a shaft 62a. The encoder disc 68 has a periphery 69, shown in greater detail in FIG. 6, which is movable through a light beam 70 transmitted from a phototransmitter 71 to a photoreceiver 72 in a plane perpendicular to the periphery 69.

Figure 6:
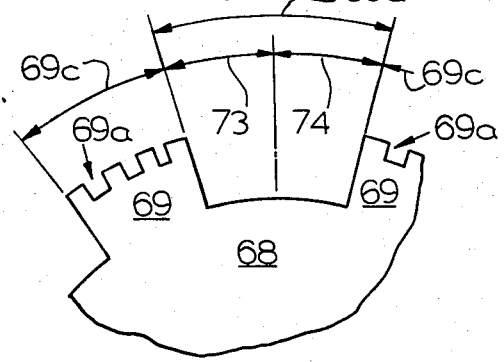
FIG. 6 is a detailed fragmentary view of the disc encoder utilized in the present invention.

As shown in FIG. 6, the encoder disc 68 has a plurality of radial slots 69a and 69b thereon. Slots disposed in the group referred to at 69a are positioned to correspond to binary coded information, with such sectors 69c being separated by non-information carrying sectors 69d. Each sector 69c contains an identification code for a corresponding switch station so that when the encoder disc 68 is fixed on the shaft 62 a fixed relation will exist between the position of a respective sector 69c and the associated switch. The slots 69a and 69b allow momentary transmission of the light beam 70 between the transmitter 71 and the receiver 72, with the receiver 72 relaying the received light pulses in the form of electrical impulses to the microprocessor 30. The microprocessor senses each trailing edge after receipt of a signal to determine if it is sensing a large slot 69b or one of the coding slots 69a. Once the microprocessor 30 senses a large slot 69b, it watches for the leading edge of the next sector 69c and then begins to read the binary coded decimal station number that is approaching. According to the program entered into the microprocessor 30, the annular position of the shaft 62 and the hammer 61 can be analyzed to determine which switch station the hammer is approaching as it rotates.

If the hammer 61 is approaching a switch station which is in an electrically nonconducting state, i.e., an actuator 45 is wedged between the contact-carrying members 43 and 44, and the program calls for changing the state of that switch, the solenoid 57 will be energized upon receipt of the proper signal from the encoder disc 68 that the hammer 61 is positioned between the actuator 45 to be moved and the preceding actuator. When the solenoid 57 is energized, the plunger 59 will pull the bar 56 downward, thereby forcing the hammer 61 closer to the module top 42. As the hammer 61 continues to rotate, the actuator 45 will be received in the opening 75 in the hammer 61 and one of the ramp surfaces 76 carried on the hammer 61 will engage the actuator head 49. As the hammer 61 continues to rotate, the ramp 76 will lift the actuator 45 upward allowing contacts 43a and 44a to close. When the hammer has cleared the actuator of the solenoid 57 may be de-energized to allow the spring 64 to force the hammer 61 away from the module top 42 to a position above the tops 59 of the actuators 45.

Because the actuator heads 49 in the embodiment shown in FIG. 3 are disposed on the sides of a square, the hammer 61 must carry the elongated actuator head 61a, so that one or the other of the ramp surfaces 77 will engage the head 49 of a selected actuator 45.

When the opposite operation is programmed to occur, i.e., changing a switch from a conducting state to a nonconducting state, the solenoid 57 is momentarily energized when the encoder disc 68 relays a signal to the microprocessor 30 that the hammer 61 is positioned directly above an actuator 45 to be moved. When this occurs, the hammer 61 is moved downward to strike an actuator 45 with the bottom surface of one of the lugs 77. This forces the ramp surface 48a between the contact-carrying members 43 and 44 and positions the upper portion 48 of the actuator 45 between the members to separate the contacts 44a and 43a. The stop 46 prevents further downward movement of the actuator 45.

Figure 7:
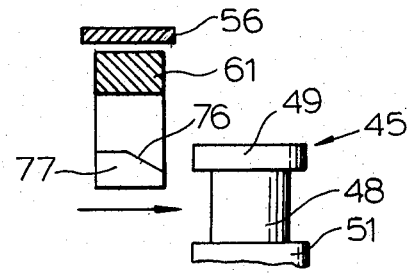
FIG. 7 is a fragmentary view partially in section taken along line VII—VII of FIG. 4 showing the power switch module hammer immediately prior to engagement of one of its camming surfaces with an actuator head.

The cooperative engagement of the ramp surface 76 carried on the hammer 61 and the actuator 45 is shown in detail in FIG. 7. FIG. 7 shows the hammer 61 as it approaches the actuator 45, corresponding to the position shown in FIG. 4. FIG. 5 shows the actuator 45 in a lifted position after the hammer 61 has passed the actuator.

Figure 8:
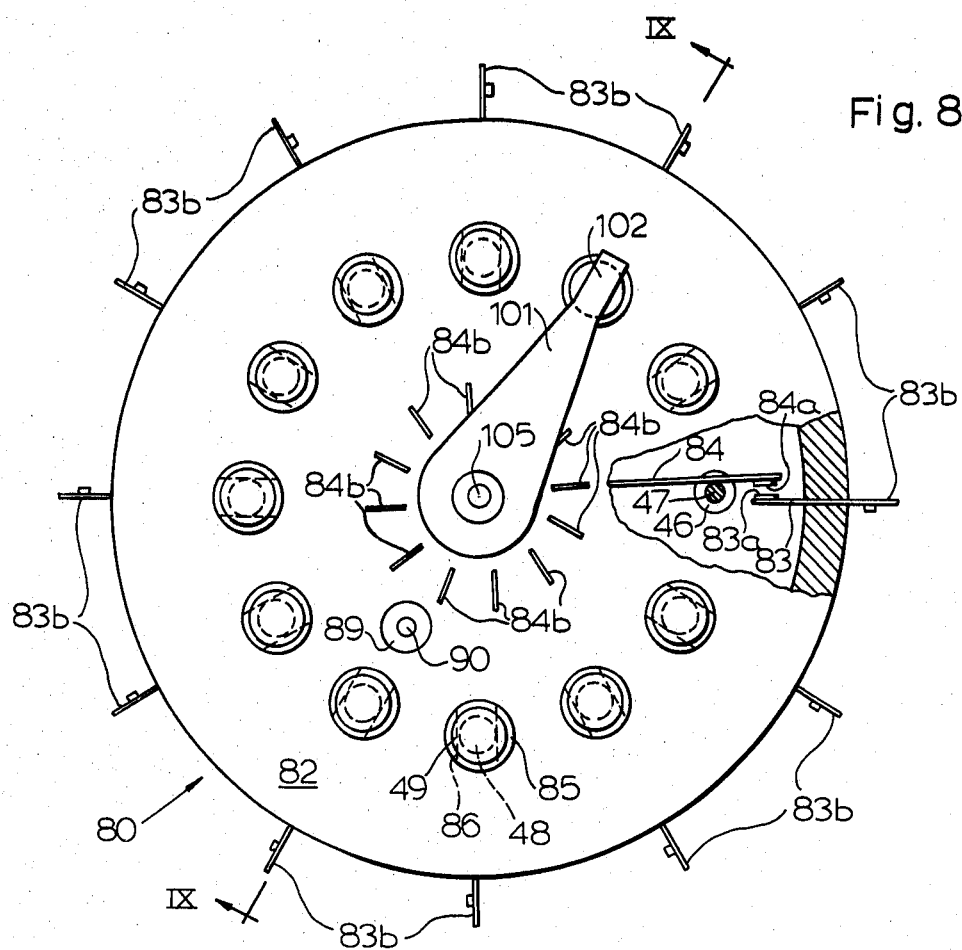
FIG. 8 is a plan elevational view partially cut away, of a power switch module having actuator heads disposed in a circular pattern.

A circular embodiment of a power switch module is shown in FIG. 8 at 80. Parts corresponding to those described in connection with the square embodiment shown in FIGS. 3, 4 and 5 are identically numbered. The module 80 consists of a circular housing 81 covered by a top 82. A plurality of stationary contact-carrying members 83 are fixed in the housing 81 carrying contacts 83a, and having terminals 83b extending out of the module 80. A like number of movable contact-carrying members 84 are radially disposed in the interior of the module 80 and have contacts 84a and terminals 84b extending upwardly at a central portion of the module 80.

Figure 9:
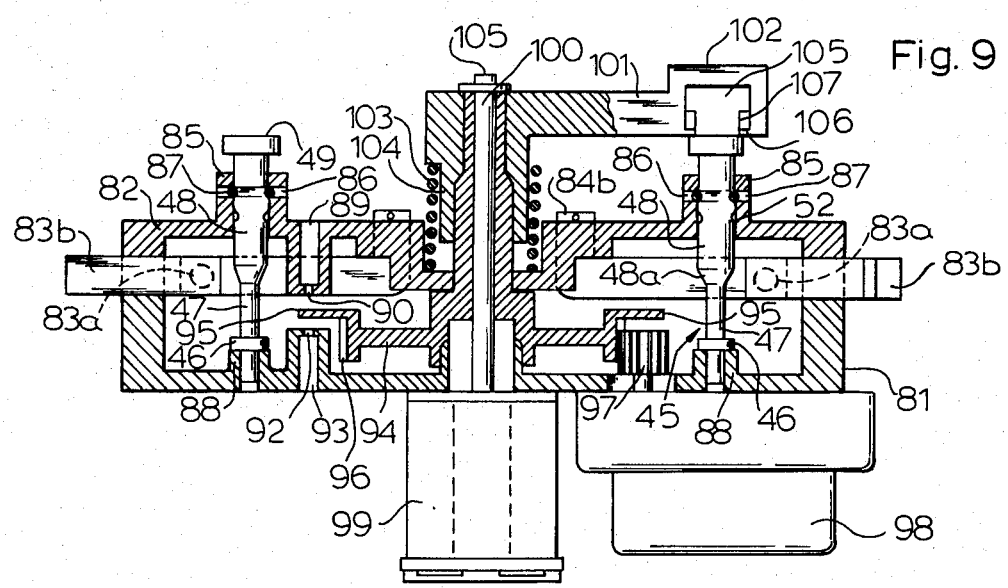
FIG. 9 is a sectional view taken along line IX—IX of FIG. 8.

As shown in FIG. 9, each actuator 45 is maintained in general vertical position by bosses 85 and 88 integrally formed in registry on the module 80. Each boss 85 has an annular groove 86 thereon for receiving a snap ring 87 for engagement with detents 52 on each actuator 45.

The module 80 is provided with apertures 89, 90, 92 and 93, all in registry, for transmission of a light beam in the manner described in connection with the square embodiment. A light transmitter and light receiver therefor are not shown. An encoder disc 95 is rotated between the apertures 90 and 92 and operates in an identical manner to that described above. The encoder disc 95 is carried on a plate 94 having gear teeth 96 thereon for engagement with a drive gear 97 rotated by a drive means 98 such as a timer motor.

A solenoid 99 connected to the housing 81 has an elongated plunger 100 which is corotatably attached to the plate 94 for simultaneous rotation therewith by the drive means 98. The shaft 100 is corotatably attached to a hammer 101 by a collar 104. The hammer 101 terminates in a portion 102 which is continuously rotated over the actuator heads 49. The portion 102 in the circular embodiment shown in FIG. 8 is not elongated as is the portion 61a shown in FIG. 3 because the actuator heads 49 in the circular embodiment are spaced equidistantly from a center of the module 80. The portion 102 has a receptacle 105 in a lower portion thereof having an opening defined by inwardly extending lugs 106 having a ramp surface 107.

Operation of the module 80 is identical to that described above for the module 40, except that in the embodiment shown in FIGS. 8 and 9 striking of the actuator head 49 by the hammer 101 is accomplished by the full lug area 106 striking the head 49, rather than a portion thereof as in the square embodiment when a switch is to be moved to a nonconducting state. Similarly, the actuator head 49 is engaged on both sides by the ramp surfaces 107, rather than one or the other of the ramp surfaces 76 as shown in FIG. 4.

Although modifications and changes may be suggested by those skilled in the art it is the intention of the inventors to embody within the patent warranted hereon all changes and modifications as reasonably and properly come within the scope of their contribution to the art.

The embodiments of the invention in which an exclusive property or privilege is claimed are defined as follows:

1. A power switch module for use with a control device for sequential energization of a plurality of electrical components connected in circuit with said module, said module comprising:

a rotatable shaft;

means for rotating said shaft;

a plurality of switches each having an open and a closed state;

a plurality of switch actuators disposed around said shaft, said actuators being movable to change a switch state, each said actuator having a head thereon;

a hammer mounted on said shaft for rotational movement and for axial movement from a first plane above said actuator heads to a second plane wherein portions of said hammer are engageable with portions of said actuator heads said hammer having means carried thereon for engagement with selected actuator heads in said second plane for moving selected actuators to change switch states;

means operated by said control device for moving said hammer from said first plane to said second plane for engagement with selected ones of said heads; and a feedback means associated with said shaft to relay a signal corresponding to the angular position of said shaft to said control device, whereby said control device operates said hammer moving means upon receipt of a pre-determined angular position signal to engage said hammer with an actuator head to change a switch state.

2. The power switch module of claim 1 wherein each said switch is normally closed and is comprised of two leaf spring contact carrying members, each having a contact at an end thereof, and wherein each said actuator carries a wedge disposed between said contact carrying member such that movement of said actuator in a first direction forces said contacts apart and said switch is in said open state, and movement of said actuator in a second opposite direction allows said contacts to abut and said switch is in said closed state.

3. The power switch module of claim 1 wherein said means carried on said hammer for engagement with said actuator heads includes a striking surface and a camming surface and wherein operation of said hammer moving means when said hammer is disposed directly above an actuator head permits engagement of said striking surface with said head, and operation of said hammer moving means immediately before said hammer is directly above an actuator head permits engagement of said hammer camming surface with a cam follower carried on said head.

4. The power switch module of claim 3 wherein movement of a switch actuator by said striking surface opens a switch and movement of a switch actuator by a camming surface closes a switch.

5. The power switch module of claim 1 wherein said means operated by said control device for moving said hammer is a solenoid.

6. The power switch module of claim 1 wherein said feedback means associated with said shaft is an encoder disc having radial slots on a periphery thereof disposed in coded positions corresponding to each said switch, and wherein said encoder disc periphery moves perpendicularly through a light beam transmitted by a photo-transmitter and received by a photo-receiver connected to said control device whereby a light transmission pattern resulting from movement of said radial slots through said light beam informs said control device of the angular position of said shaft.

7. The power switch of claim 1 wherein said actuator heads are disposed in a circle and said shaft is disposed at a center of said circle and said hammer moving means is connected to said shaft to simultaneously move said shaft and said hammer.

8. The power switch module of claim 1 wherein said switches are disposed on the sides of a square and said shaft is disposed at a center of said square, and said hammer moving means is disposed at a corner of said square, and said module further comprises a bar disposed on a diagonal of said square above said hammer and engageable therewith, said bar attached to said hammer moving means for movement thereby to move said hammer.

9. The power switch module of claim 1 wherein said second plane coincides with the top of said actuator heads.

10. The power switch module of claim 1 wherein said second plane coincides with the bottom of said actuator heads.

11. In an automatic washer having a timing means for sequencing said washer through a plurality of operations in a washing cycle and a plurality of electrical devices connectable to a source of electric potential to perform said operations in accordance with a program command from said timing means, a switch module for making connections between said potential and said devices, said module comprising:

a rotatable shaft;

an array of switches disposed in a pattern about said shaft, each of said switches connecting one of said devices to said electric potential and said switches each having an actuator movable between a switch open and a switch closed position;

a hammer connected to said shaft normally disposed in a first portion, said hammer having a cam surface and a striking surface, said cam surface operable to move said switch actuator from one of said open or closed positions to the other of said open or closed positions whenever said hammer is moved from said first position to a second position, and said striking surface operable to move said switch actuator to switch positions opposite to the switch positions effected by said cam surface;

a solenoid electrically connected to said timing means and actuatable to move said hammer from said first position to said second position, a motor connected to said shaft for driving said shaft in rotation; and feedback means providing said timing means with a signal indicating the angular position of said hammer, said timing means processing said feedback signal to provide a program command to actuate said solenoid to connect or disconnect said devices at desired times in said washing cycle.

12. The power switch module of claim 11 wherein each said switch is normally closed and is comprised of two leaf spring contact carrying members, each having a contact at an end thereof, and wherein each said actuator carries a wedge disposed between said contact carrying members such that movement of said actuator in a first direction forces said contacts apart and said switch is in said open position, and movement of said actuator in a second opposite direction allows said contacts to abut and said switch is in said closed position.

13. The power switch module of claim 11 wherein said feedback means comprises an encoder disc connected to said shaft having radial slots on a periphery thereof disposed in coded positions corresponding to each said switch, and wherein said encoder disc periphery moves perpendicularly through a light beam transmitted by a photo-transmitter and received by a photo-receiver connected to said timing means whereby a light transmission pattern resulting from movement of said radial slots through said light beam informs said timing means of the angular position of said shaft.

14. The switch module of claim 11 wherein said pattern of said array of switches is a circle and said shaft is disposed at a center of said circle, and wherein said shaft is axially movable and said solenoid is connected to said shaft for simultaneous movement of said shaft and said hammer.

15. The switch module of claim 11 wherein said pattern of said array of switches is a square and said shaft is disposed at a center of said square, wherein said solenoid is disposed at a corner of said square, and wherein said module further comprises a bar disposed on a diagonal of said square above said hammer and engageable therewith, said bar movable by said solenoid to simultaneously move said hammer.

16. The switch module of claim 11 wherein said cam surface moves said switch actuator to a switch closed position.

17. A method of sequentially operating a plurality of switches in response to signals received from a control device, each switch having an actuator associated therewith movable to change the state of the associated switch, said method comprising the steps of:
arranging said actuators in a closed pattern around a rotating shaft having a hammer perpendicularly attached thereto;
continuously rotating said hammer a distance above said actuators;
relaying the angular position of said shaft to said control device;
generating a displacement signal from said control device upon said shaft attaining a pre-selected angular position;
moving said hammer toward a selected actuator upon generation of said displacement signal; and
engaging said hammer with said selected actuator to change the state of an associated switch.

18. The method of claim 17 wherein the step of relaying the angular position of said shaft to said control device comprises the steps of:
rotating an encoder disc having coded radial slots in a periphery thereof with said shaft;
transmitting a beam of light between a light transmitter and a light receiver;
interrupting said light beam by moving said encoder disc periphery perpendicularly therethrough and generating a pattern of interruptions corresponding to the positions of said radial slots in said periphery; and
generating electrical signals corresponding to said interruption pattern and transmitting said signals from said light receiver to said control device.

19. The method of claim 17 wherein the step of engaging said hammer with said selected switch actuator to change the state of an associated switch is further defined by the steps of:
striking said actuator with said hammer to move said actuator toward said switch to place said switch in a first stage; and
camming said actuator with said hammer away from said switch to place said switch in a second state.

* * * * *

UNITED STATES PATENT AND TRADEMARK OFFICE
CERTIFICATE OF CORRECTION

PATENT NO. : 4,291,238
DATED : September 22, 1981
INVENTOR(S) : Albert T. Braga et al.

It is certified that error appears in the above—identified patent and that said Letters Patent is hereby corrected as shown below:

Column 8, claim 11, line 36, after "first" erase "portion" and insert --position--.

Column 10, claim 19, line 33, after "first" erase "stage" and insert --state--.

Signed and Sealed this

Fifteenth Day of December 1981

|SEAL|

Attest:

Attesting Officer

GERALD J. MOSSINGHOFF

Commissioner of Patents and Trademarks